(12) United States Patent
Ku et al.

(10) Patent No.: US 9,124,600 B2
(45) Date of Patent: Sep. 1, 2015

(54) SMART PHONE SYSTEM FOR DIALING THROUGH LOCAL CALL AND METHODS THEREOF

(75) Inventors: Ning Yun Ku, Taipei (TW); Ching Hai Lin, Taipei (TW); Shaw Hwa Hwang, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 707 days.

(21) Appl. No.: 13/354,567

(22) Filed: Jan. 20, 2012

(65) Prior Publication Data

US 2013/0189968 A1    Jul. 25, 2013

(51) Int. Cl.
```
H04W 68/00      (2009.01)
H04M 3/42       (2006.01)
H04W 4/00       (2009.01)
H04W 40/00      (2009.01)
H04L 29/06      (2006.01)
H04W 4/16       (2009.01)
```
(52) U.S. Cl.
CPC .......... *H04L 65/104* (2013.01); *H04L 65/1069* (2013.01); *H04L 65/608* (2013.01); *H04W 4/16* (2013.01)

(58) Field of Classification Search
CPC ................... H04L 29/08108; H04W 84/022
USPC ............ 455/414.1, 435.1, 459, 461, 462, 445
See application file for complete search history.

(56) References Cited

U.S. PATENT DOCUMENTS

| | | | |
|---|---|---|---|
| 7,912,503 B2 | 3/2011 | Chang et al. | |
| 2006/0023657 A1* | 2/2006 | Woodson et al. | 370/328 |
| 2008/0281975 A1* | 11/2008 | Qiu et al. | 709/230 |
| 2009/0197594 A1* | 8/2009 | Chintada et al. | 455/426.2 |
| 2009/0252158 A1* | 10/2009 | Maag et al. | 370/352 |

* cited by examiner

*Primary Examiner* — Dung Hong
(74) *Attorney, Agent, or Firm* — Bacon & Thomas, PLLC

(57) ABSTRACT

A smart phone system includes a smart phone with wireless local area communication function, a home phone, a public switched telephone network (PSTN) or Internet, a radio base station, a smart wireless phone gateway and an outside phone, the system utilizing the wireless local area communication system for the smart phone to register in the smart wireless phone gateway, and utilizing the smart wireless phone gateway for dialing out through the public switched telephone network (PSTN) or Internet.

5 Claims, 20 Drawing Sheets

SMART PHONE SYSTEM FOR DIALING THROUGH LOCAL CALL AND METHODS THEREOF

FIELD OF THE INVENTION

The present invention relates to a smart phone system for dialing through local call and methods thereof, and more particularly to a smart phone for utilizing wireless local area communication to register in a smart wireless phone gateway, and utilizing the smart wireless phone gateway for dialing out through a public switched telephone network (PSTN) or Internet; when an outside phone dials in through the public switched telephone network (PSTN), Internet or a radio base station, the smart phone and the home phone ring simultaneously, after one of the smart phone or the home phone is picked up, then the other one stops ringing

BACKGROUND OF THE INVENTION

A smart phone is very convenient for outdoor use, telephone numbers of relatives and friends are stored in a phone list in the smart phone, and touching the name of relatives and friends displayed on the smart phone is used for dialing out.

After going home, generally a home phone is used for dialing out, the home phone has no phone list, so the phone list in the smart phone is used for looking up, and then dialing out through the home phone, it is not convenient.

WiFi is a wireless local area network (WLAN) system based on IEEE 802.11. The communication range of WiFi are limited, a typical wireless router based on 802.11b or 802.11g and WLAN antenna has a range of about 32 meters indoors and 95 meters outdoors, so WiFi is only suitable to home or indoor wireless communication.

VoIP (Voice over Internet Protocol) is one of the popular communication technology. In VoIP, SIP (Session Initiation Protocol) defined by IETF is the most widely used protocol because of its simple structure, expandability and easy operation.

SUMMARY OF THE INVENTION

The object of the present invention is to provide a smart phone system for dialing through local call and methods thereof.

The smart phone system for dialing through local call comprises:

a smart phone with wireless local area communication function;

a home phone;

a public switched telephone network (PSTN);

a radio base station;

an outside phone;

a smart wireless phone gateway placed between the home phone and the PSTN for accepting a registration and a dialing of the smart phone and dialing out through the PSTN; and for accepting a dialing-in from the outside phone through the PSTN to the home phone so as to cause the smart phone and home phone ringing simultaneously, when a user picks up the home phone, the smart phone stops ringing, when the user picks up the smart phone, the home phone stops ringing; and for accepting a dialing-in from the outside phone through the radio base station to the smart phone so as to cause the smart phone and home phone ringing simultaneously, when the user picks up the home phone, the smart phone stops ringing, when the user picks up the smart phone, the home phone stops ringing;

wherein the smart wireless phone gateway comprises an antenna, a power terminal, an FXS interface, an FXO interface, a digital signal processor, a VoIP processor, an access point, a power circuit, a flash memory, an RJ11 PSTN terminal, an RJ11 telephone line terminal and a relay;

wherein a software in the VoIP processor is based on Linux system for executing four actions as below:

a. processing the registration of the smart phone to the VoIP processor;

b. analyzing an INVITE message received from the antenna by the VoIP processor to take out a telephone number, and then dial out the telephone number through the FXO interface;

c. when a ringing signal is detected by the FXO interface (i.e. an outside phone is dialing in through the PSTN), the ringing signal will cause the home phone ringing through FXS interface, and cause the smart phone ringing through the VoIP processor, the access point and the antenna;

d. when the outside phone dials to the smart phone through the radio base station, the smart phone issues a "Ring-in" message by wireless local area communication through the antenna, the access point to the VoIP processor, the VoIP processor will then cause the home phone ringing through the FXS interface.

The method for smart phone system to dial through local call is based on the system stated above, comprises:

a. a registration step: a user brings a smart phone outdoors, the smart phone repeats to detect an WiFi message; as the user enters home, the smart phone detects the WiFi message from the smart wireless phone gateway at home, so the smart phone registers to the smart wireless phone gateway; if the registration succeeds, a "registration succeeds" message packet will be received; if the registration fails, a "registration fails" message packet will be received, the user then check if a user's information is wrong;

b. a dialing-out step: the user uses the smart phone for dialing-out, the user select related name in a phone list of the smart phone, and touching a name displayed on the smart phone for dialing out; the smart wireless phone gateway will then judge if related registration exists or not, if yes, then the smart wireless phone gateway will dial through the PSTN, after the outside phone is picked up, both sides communicates; if no, then the smart wireless phone gateway will return an "error" message to the smart phone;

c. a first dialing-in step: the outside phone dials the home phone through the PSTN, the smart wireless phone gateway waits for a ringing message from the PSTN; If no ringing message, then wait continually; if a ringing message is received, then the smart wireless phone gateway judges if there is a user related registration information; if no user related registration information, then the smart wireless phone gateway causes the home phone ringing, so a user can only pick up the home phone for communication; if the user related registration information exists, then the smart wireless phone gateway causes the smart phone and the home phone ringing simultaneously; if a user picks up the home phone, then the smart phone stops ringing, if the user picks up the smart phone, then the home phone stops ringing;

d. a second dialing-in step: the outside phone dials the smart phone through the radio base station, the smart phone waits for a ringing message from the radio base station; if no ringing message, then wait continually; if a ringing message is received, then the smart phone judges if the smart phone had registered in the smart wireless phone gateway; if no, then the home phone does not ring, a user can only pick up the smart phone for communication; if yes, then the home phone also rings; thereafter, if the user picks up the home phone, then the smart phone stops ringing, and the smart phone will receive the call from the outside phone through the radio base station, and let the user use the home phone for communication, voices of both sides are through the smart phone; if the user picks up the smart phone, then the home phone stops ringing.

BRIEF DESCRIPTION OF THE DRAWINGS

FIG. 15 shows the procedure of dialing-in.

FIG. 16 shows another procedure of dialing-in.

DETAILED DESCRIPTION OF THE PREFERRED EMBODIMENTS

Figure 1:
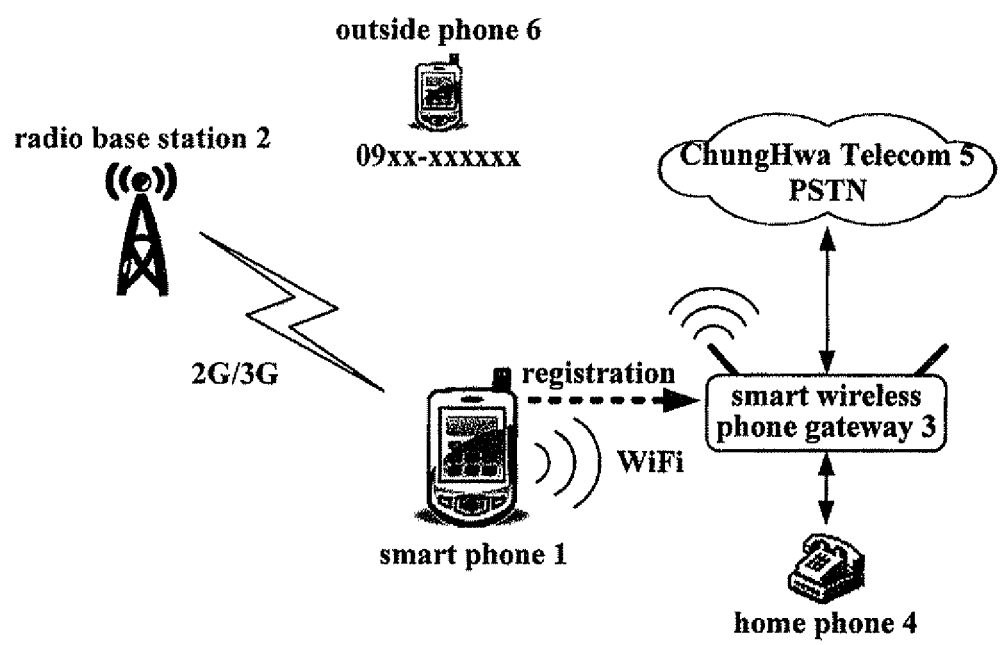
FIG. 1 shows the schematic environmental diagram for a smart phone at home to communicate with 2G/3G radio and to communicate with WiFi.

As shown in FIG. 1, a smart phone 1 goes home, and can dial out through 2G/3G radio base station 2 or communicate with a smart wireless phone gateway 3 by utilizing wireless local area communication (WiFi, Bluetooth, ZigBee . . . ). The smart phone 1 has a function of wireless local area communication. The present embodiment uses WiFi as the wireless local area communication system.

The smart wireless phone gateway 3 is placed between a home phone 4 (local phone) and ChungHwa Telecom 5 (PSTN, Public switched telephone network).

After the smart phone 1 goes home, the smart phone 1 will automatically search for WiFi signals. If WiFi signals exist, then the smart phone 1 will register in the smart wireless phone gateway 3, i.e. send out "registration packet" to the smart wireless phone gateway 3 to verify user's data of the smart phone 1 (such as telephone number of the smart phone, user's account, pass word, . . . etc.).

Figure 2:
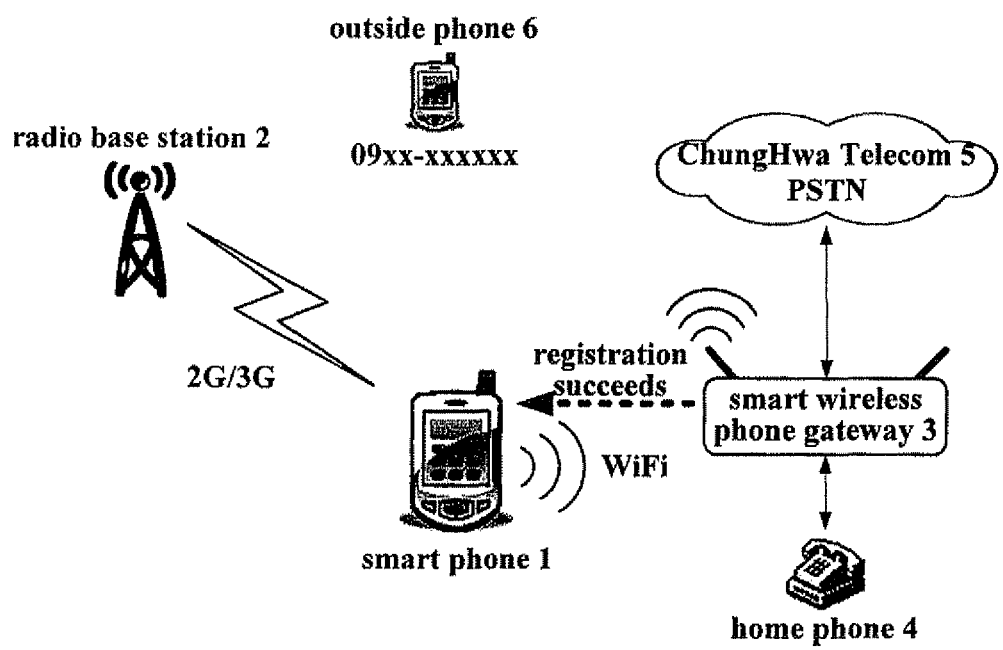
FIG. 2 shows that after the verification by the smart wireless phone gateway succeeds, a "registration succeeds" message is issued to the smart phone.

As shown in FIG. 2, after the verification by the smart wireless phone gateway 3 succeeds, the smart wireless phone gateway 3 will issue "registration succeeds" message to the smart phone 1, and then the smart phone 1 can dial out through the smart wireless phone gateway 3.

Figure 3:
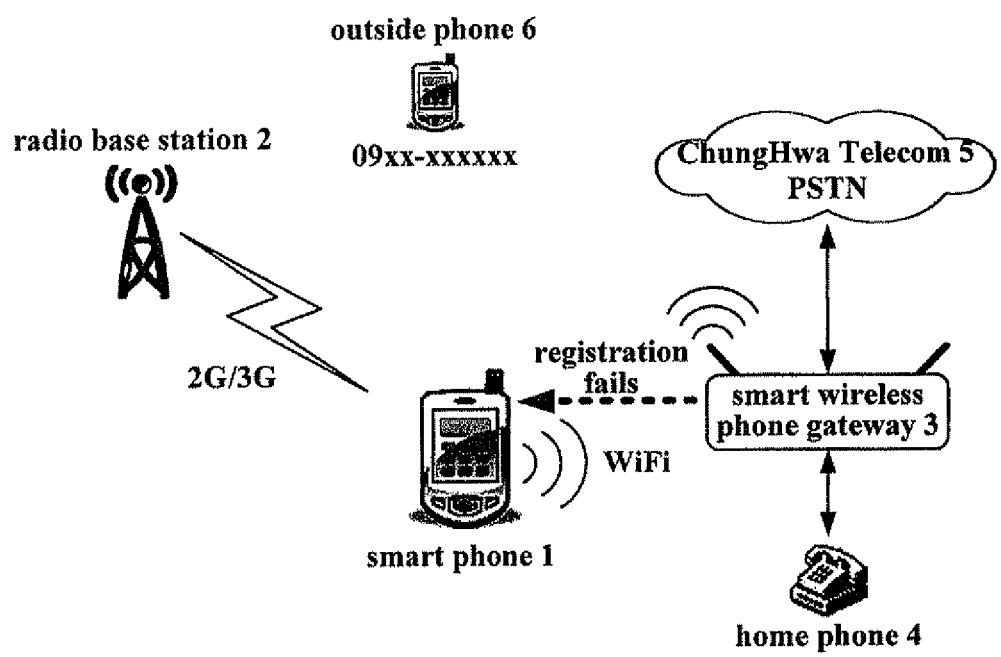
FIG. 3 shows that the verification fails, the smart wireless phone gateway issues "registration fails" message to the smart phone.

As shown in FIG. 3, if the verification fails, then the smart wireless phone gateway 3 will issue "registration fails" message to the smart phone 1. The failure may be caused by a wrong account/pass word, or the telephone number of the smart phone 1 has not been registered in the smart wireless phone gateway 3.

Figure 4:
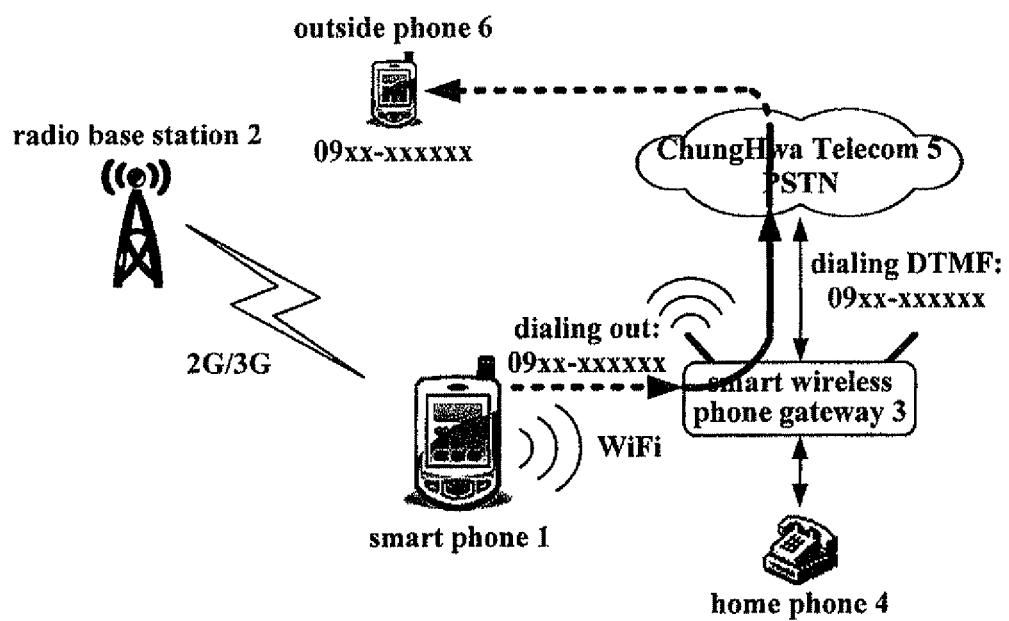
FIG. 4 shows the schematic diagram that the smart phone dials out through the smart wireless phone gateway, ChungHwa Telecom (PSTN).

As shown in FIG. 4, after the smart phone 1 is succeeded for registration in the smart wireless phone gateway 3, a user can select related name in a phone list of the smart phone 1, and touching a related name displayed on the smart phone for dialing out "dialing+telephone number" message through WiFi to the smart wireless phone gateway 3. After the smart wireless phone gateway 3 receives that message, the smart wireless phone gateway 3 will analyze the message to take the telephone number, and then dial out through ChungHwa Telecom 5 (PSTN, Public switched telephone network).

Figure 5:
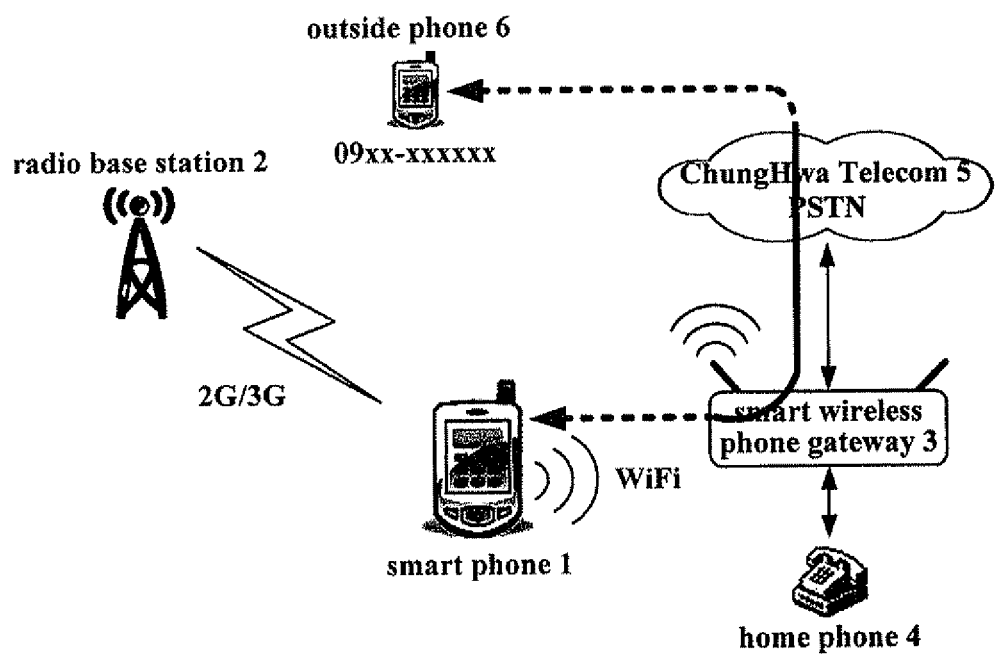
FIG. 5 shows that the outside phone picks up the call for communication.

As shown in FIG. 5, when an outside phone 6 picks up the phone, communication begins for both sides.

Figure 6:
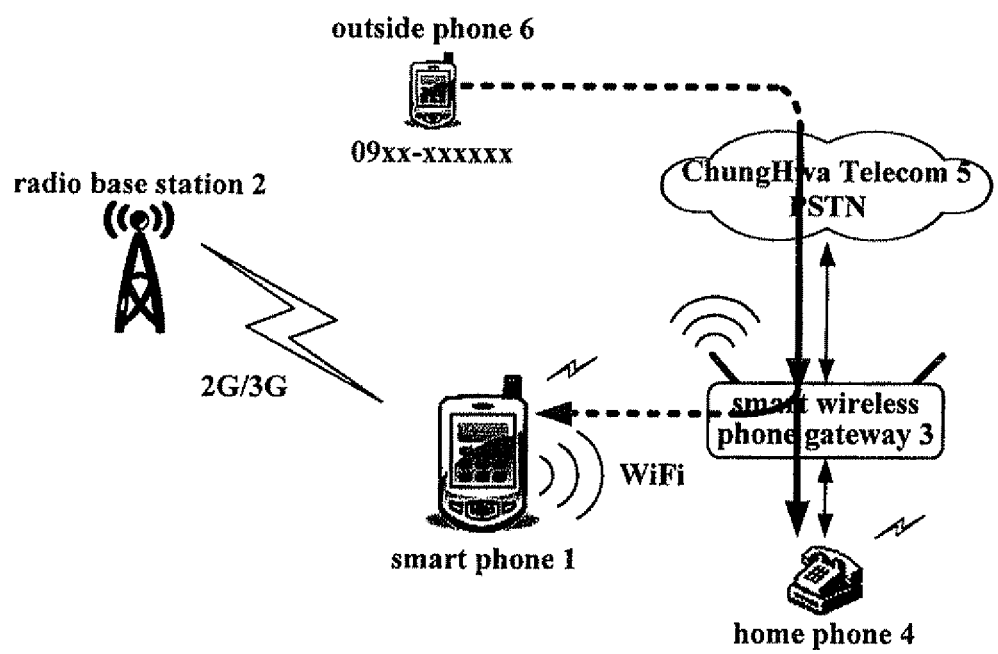
FIG. 6 shows when the outside phone dials to the home phone, the smart wireless phone gateway receives the dialing-in message of the outside phone, and then cause the home phone and the smart phone ringing simultaneously.

A first dialing-in method is shown in FIG. 6. As the outside phone 6 dials to the home phone 4 through ChungHwa Telecom 5, the smart wireless phone gateway 3 will receive the dialing-in message of the outside phone 6, and then cause the home phone 4 and the smart phone 1 ringing simultaneously.

Figure 7:
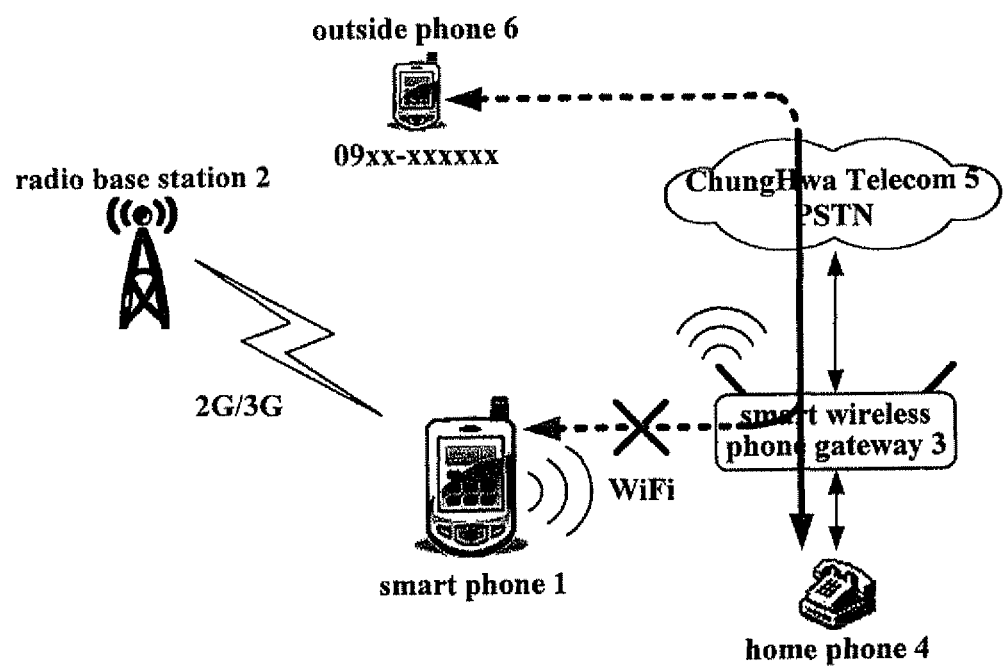
FIG. 7 shows that the user picks up the home phone for communication, the smart phone stops ringing.

As shown in FIG. 7, if a user picks up the home phone 4 for communication, then the smart phone 1 stops ringing.

Figure 8:
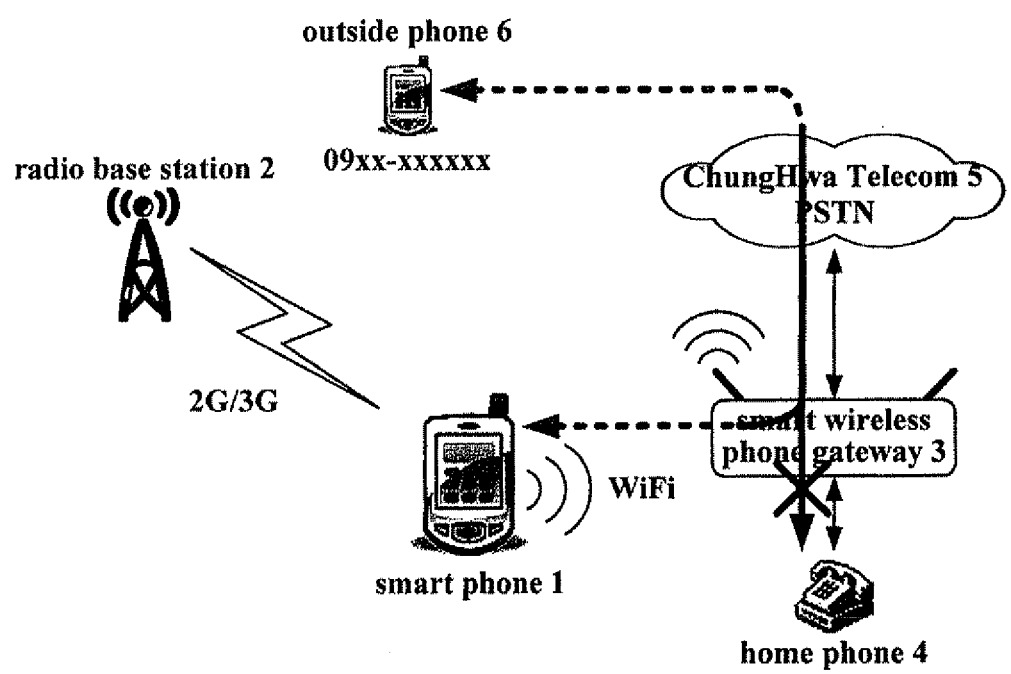
FIG. 8 shows that the user picks up the smart phone for communication, the home phone stops ringing.

As shown in FIG. 8, if the user picks up the smart phone 1 for communication, then the home phone stops ringing.

Figure 9:
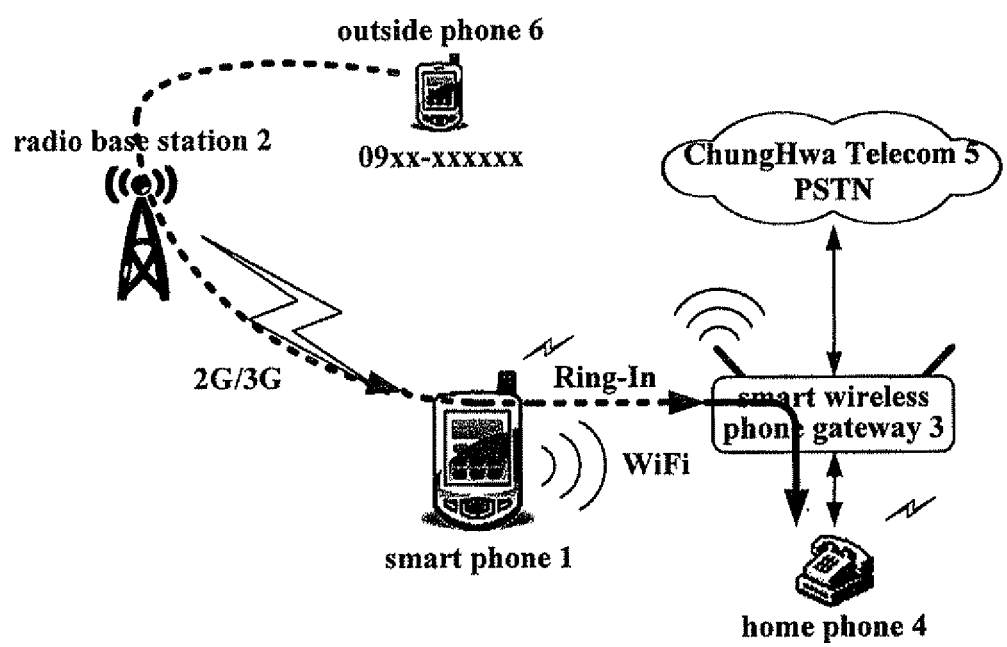
FIG. 9 shows when the outside phone dials to the smart phone through the radio base station, the smart phone cause the home phone ringing through the smart wireless phone gateway.

A second dialing-in method is shown in FIG. 9. The outside phone 6 dials to the smart phone 1 through a radio base station 2, then the smart phone 1 rings and issues "Ring-In" message through WiFi to the smart wireless phone gateway 3, the smart wireless phone gateway 3 will then cause the home phone 4 ringing.

Figure 10:
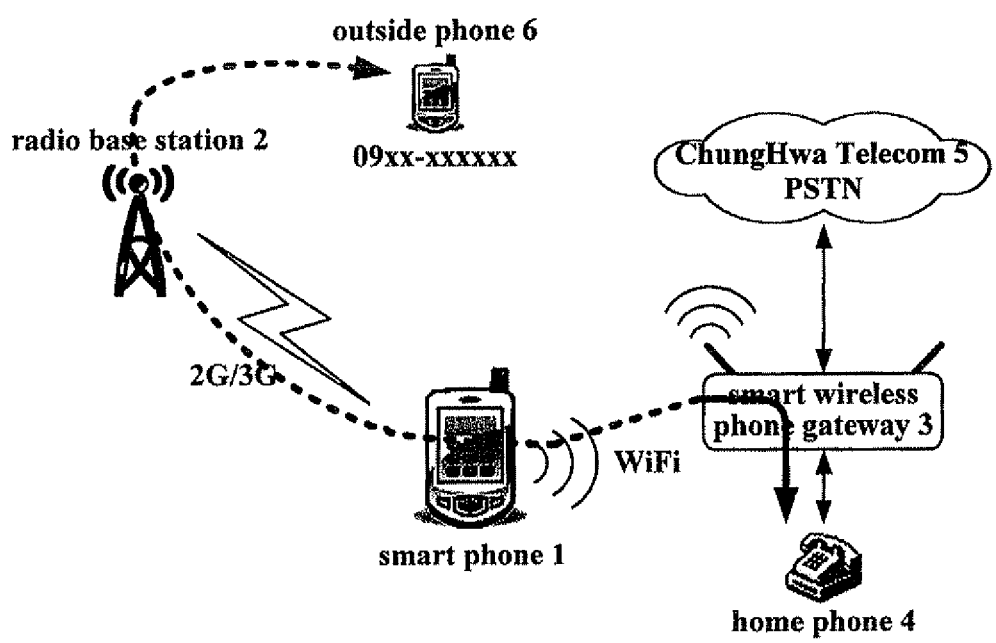
FIG. 10 shows that the user picks up the home phone for communication, voices of both sides pass through the smart phone to the other side.

The user can picks up the home phone 4 or the smart phone 1. In order to avoid the electromagnetic wave of the smart phone 1, the user can picks up the home phone 4 for communication, as shown in FIG. 10, in which the voices of both sides pass through the smart phone 1 to the other side.

The smart phone 1 is placed between the radio base station 2 and the smart wireless phone gateway 3 to connect the 2G/3G radio network and the WiFi (wireless local area communication) system. The smart phone 1 becomes the voice media for both sides, just the same as the Bluetooth earphone application.

Figure 11:
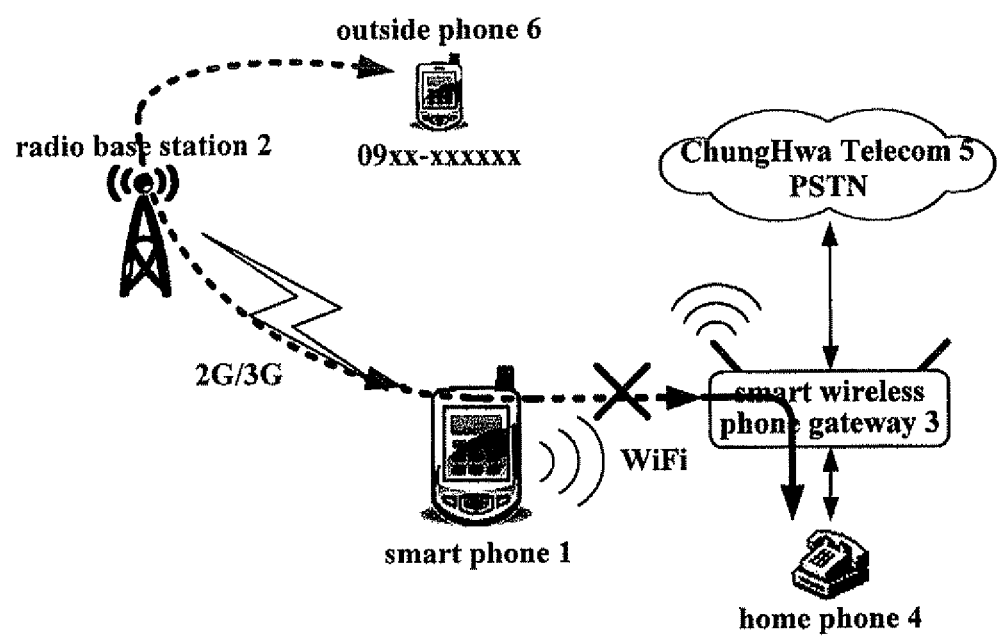
FIG. 11 shows that the user picks up the smart phone for communication, the home phone stops ringing.

As shown in FIG. 11, as the user selects to pick up the smart phone 1 for communication, the home phone 4 stops ringing to form a general mobile phone communication.

Figure 12:
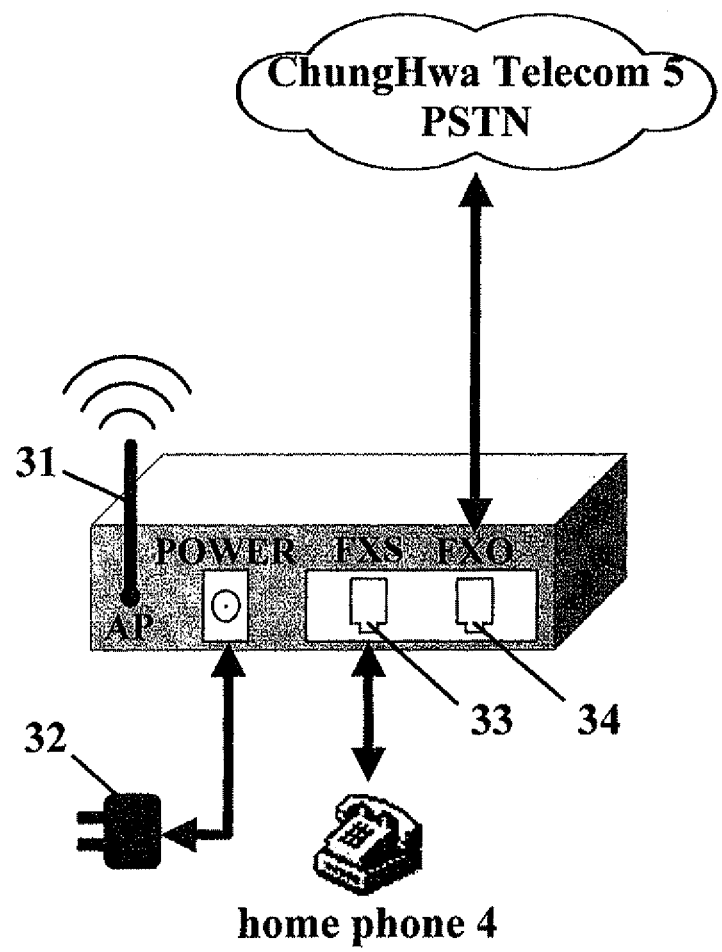
FIG. 12 shows the exterior design of the smart wireless phone gateway.

The exterior design of the smart wireless phone gateway 3 is shown in FIG. 12, comprising:
1. Antenna 31: for transmitting/receiving wireless local area communication messages.
2. Power terminal 32: for connecting 110 volt AC power.

3. FXS interface 33: for connecting the home phone 4 to generate dialing tone, activate ringing and so on.
4. FXO interface 34: for connecting the telephone line of ChungHwa Telecom 5 to send DTMF signals, detect signals from the telephone line of ChungHwa Telecom 5 (such as DTMF signals, busy signal, ringback tone, on-hook, off-hook, . . . etc.).

Figure 13:
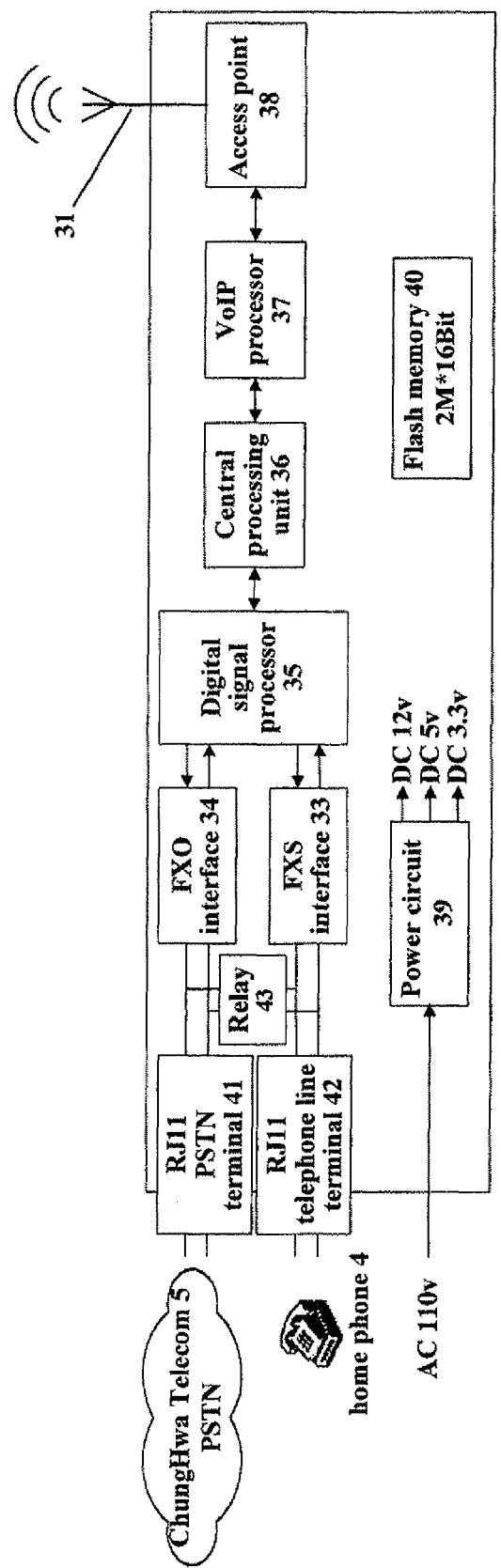
FIG. 13 shows the interior circuit block diagram of the smart wireless phone gateway.

The interior circuit block diagram of the smart wireless phone gateway 3 is shown in FIG. 13, comprising:
1. FXO interface 34: for processing signals from the telephone line of the ChungHwa Telecom 5 through RJ11 PSTN terminal.
2. FXS interface 33: for processing signals from the home phone 4 through RJ11 telephone line terminal).
3. Digital signal processor 35: for processing voice signals.
4. Central processing unit 36: for controlling the actions of every section.
5. VoIP processor 37 (VoIP Gateway): for processing the exchange between network packets and digital signals.
6. Access point 38: wireless local area network interface based on IEEE 802.11/15 standard.
7. Power circuit 39: for receiving 110 volt AC current to convert into 12 volt, 5 volt, 3.3 volt DC current.
8. Flash memory 40: with capacity of 2M×16 bits.
9. RJ11 PSTN terminal 41
10. RJ11 telephone line terminal 42
11. Relay 43

The software of the present invention is based on Linux system to develop programs in VoIP processor 37 for executing four actions as below:
1. Processing the registration of the smart phone 1 to the VoIP processor 37.
2. Analyzing the INVITE message received from the antenna 31 by the VoIP processor 37 to take out the telephone number, and then dial out the telephone number through FXO interface 34.
3. When a ringing signal is detected by FXO interface 34 (i.e. an outside phone 6 is calling in through ChungHwa Telecom 5), the ringing signal will cause the home phone 4 ringing through FXS interface 33, and cause the smart phone 1 ringing through VoIP processor 37, access point 38 and antenna 31.
4. When an outside phone 6 is calling the smart phone 1 through the radio base station 2, the smart phone 1 issues Ring-in message (in a form of network packet) by wireless local area communication through antenna 31, access point 38 to the VoIP processor 37, the VoIP processor 37 will then cause the home phone 4 ringing through the FXS interface 33.

The software methods of the present invention are described by the procedure of communication and the system flow charts as shown in FIG. 14~FIG. 20.

Figure 14:
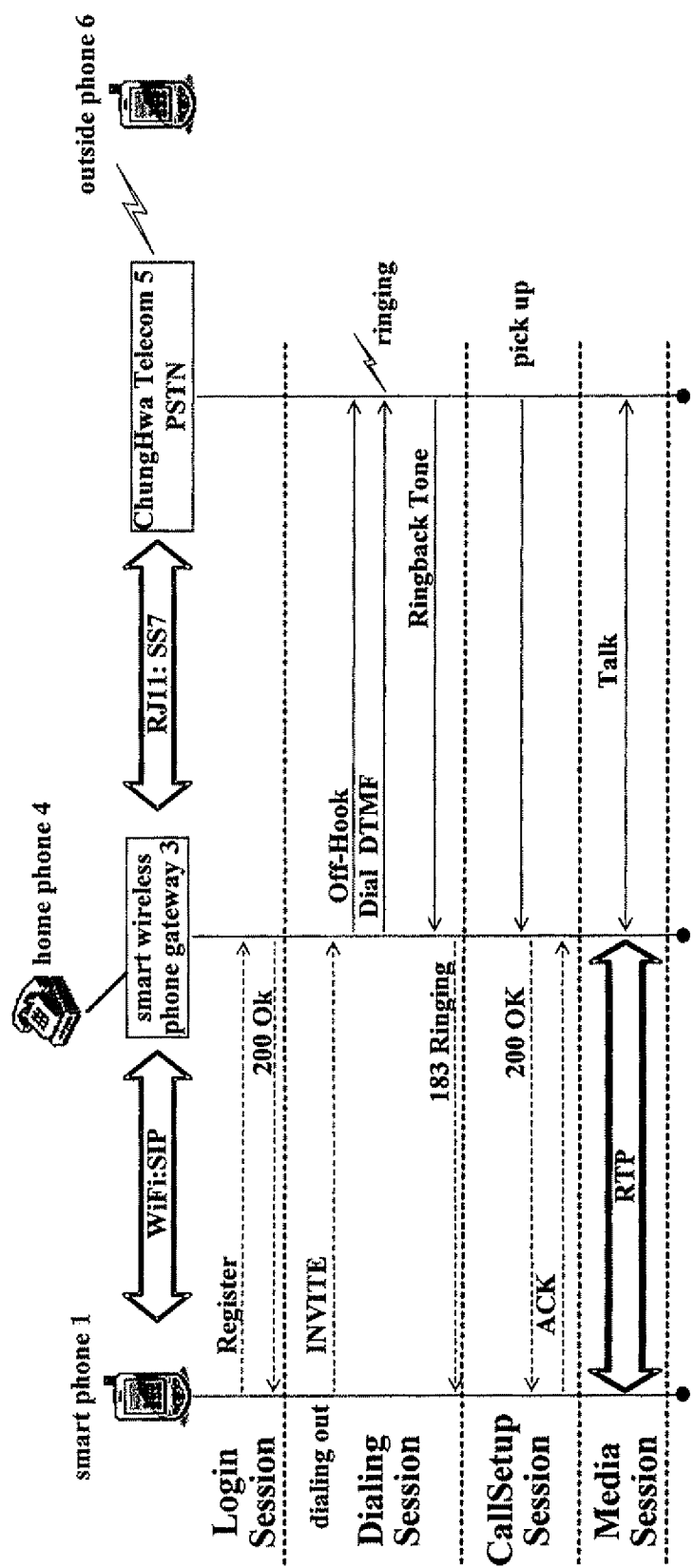
FIG. 14 shows the procedure of dialing-out.

Referring to FIG. 14 first, between the smart phone 1 and the smart wireless phone gateway 3, SIP (Session Initiation Protocol) of VoIP through WiFi is used, while the smart wireless phone gateway 3 and the ChungHwa Telecom 5 operates according to conventional RJ11:SS7. Login Session, Dialing Session, CallSetup Session and Media Session are four sessions for the operations. In Login Session, the smart phone 1 registers in the smart wireless phone gateway 3, and get a response of "200 OK" message to enter the Dialing Session. In the Dialing Session, the user selects related name in the phone list of the smart phone, and touches the name displayed on the smart phone for dialing out, an "INVITE" message is sent to the smart wireless phone gateway 3, the smart wireless phone gateway 3 will issue "Off-Hook" and "Dial DTMF" messages to the outside phone 6 through the ChungHwa Telecom 5 for generating a ringing signal, then a "Ringback Tone" message is returned so that the smart wireless phone gateway 3 issues "183 Ringing" message to the smart phone 1. When the outside phone 6 of the ChungHwa Telecom 5 is picked up, the CallSetup Session is entered, a pick up message is issued to the smart wireless phone gateway 3, the smart wireless phone gateway 3 then issues "200 OK" message to the smart phone 1, the smart phone 1 returns "ACK" message to the smart wireless phone gateway 3, thereafter the Media Session is entered, an RTP (Real Time Transport Protocol) is used for communication.

Figure 15:
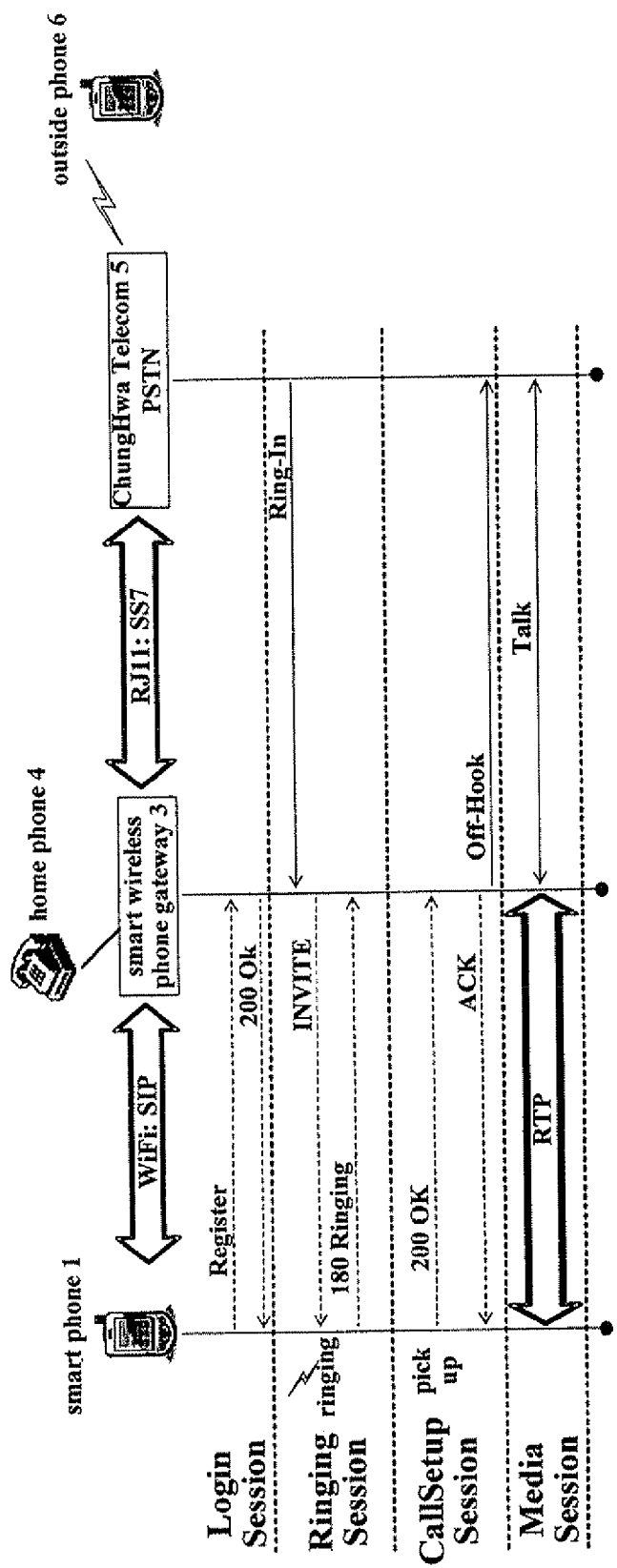

Referring to FIG. 15 next, a first procedure of dialing-in is shown. Between the smart phone 1 and the smart wireless phone gateway 3, SIP (Session Initiation Protocol) of VoIP through WiFi is used, while the smart wireless phone gateway 3 and the ChungHwa Telecom 5 operates according to conventional RJ11:SS7. Login Session, Ringing Session, CallSetup Session and Media Session are four sessions for the operations. In Login Session, the smart phone 1 registers in the smart wireless phone gateway 3, after getting a "200 OK" message, waiting for a ringing message from the outside phone 6 through the ChungHwa Telecom 5. If the smart wireless phone gateway 3 receives "Ring-In" message, an "INVITE" message is issued to the smart phone 1 for entering into the Ringing Session to generate a ringing signal, and return "180 Ringing" message to the smart wireless phone gateway 3. After the smart phone 1 is picked up, the CallSetup Session is entered for issuing "200 OK" message to the smart wireless phone gateway 3, the smart wireless phone gateway 3 will return "ACK" message to the smart phone 1. The smart wireless phone gateway 3 will also issue "Off-Hook" message to the outside phone 6, thereafter the Media Session is entered, an RTP (Real Time Transport Protocol) is used for communication.

Figure 16:
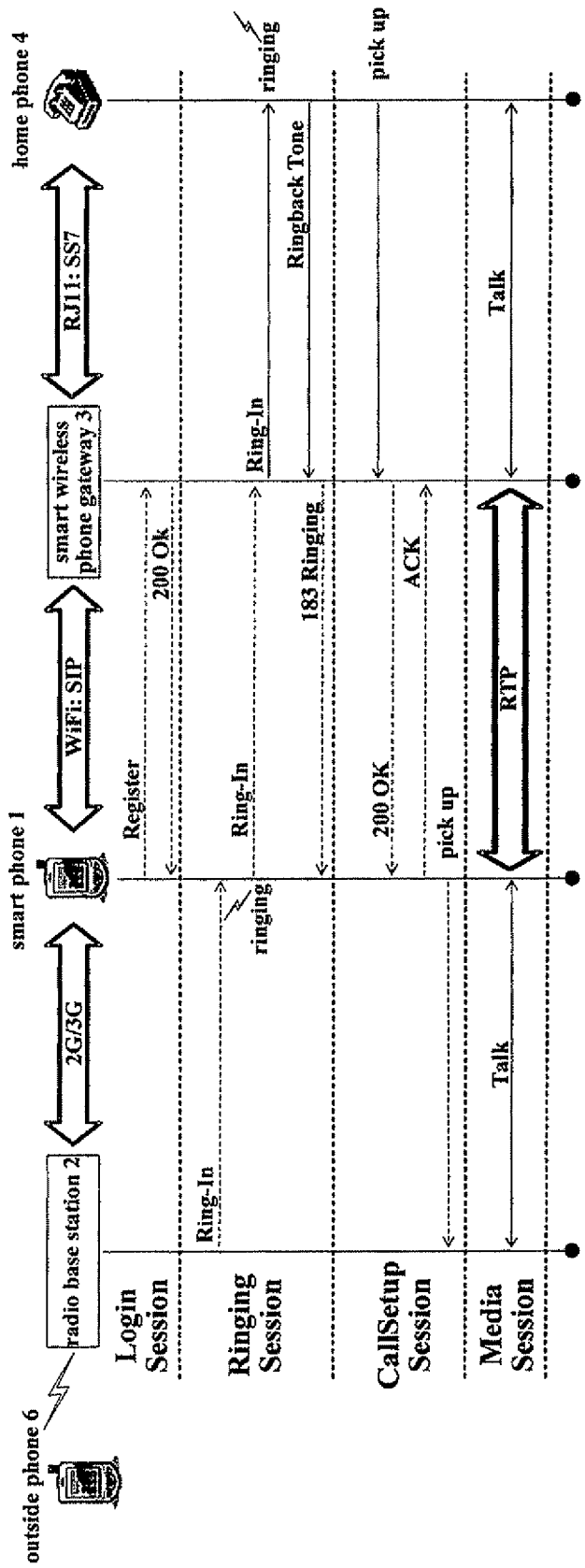

Referring to FIG. 16, a second procedure of dialing-in is shown. The radio base station 2 and the smart phone 1 communicate with 2G/3G Between the smart phone 1 and the smart wireless phone gateway 3, SIP (Session Initiation Protocol) of VoIP through WiFi is used, while the smart wireless phone gateway 3 and the home phone 5 operates according to conventional RJ11:SS7. Login Session, Ringing Session, CallSetup Session and Media Session are four sessions for the operations. In Login Session, the smart phone 1 registers in the smart wireless phone gateway 3, after getting a "200 OK" message, waiting for a calling from the outside phone 6 through the radio base station 2 to the smart phone 1. If the smart phone 1 receives "Ring-In" message to enter Ringing Session, a "Ring-In" message is issued to smart wireless phone gateway 3, the smart wireless phone gateway 3 will then issue "Ring-In" message to the home phone 4 to cause the home phone 4 ringing; the home phone 4 returns "Ringback Tone" message to the smart wireless phone gateway 3, the smart wireless phone gateway 3 returns "180 Ringing" message to the smart phone 1. After the home phone 4 is picked up, the CallSetup Session is entered, the smart wireless phone gateway 3 issues "200 OK" message to the smart phone 1, the smart phone 1 will return "ACK" message to the smart wireless phone gateway 3. The smart phone 1 picks up the calling, thereafter the Media Session is entered, an RTP (Real Time Transport Protocol) is used for communication.

Figure 17:
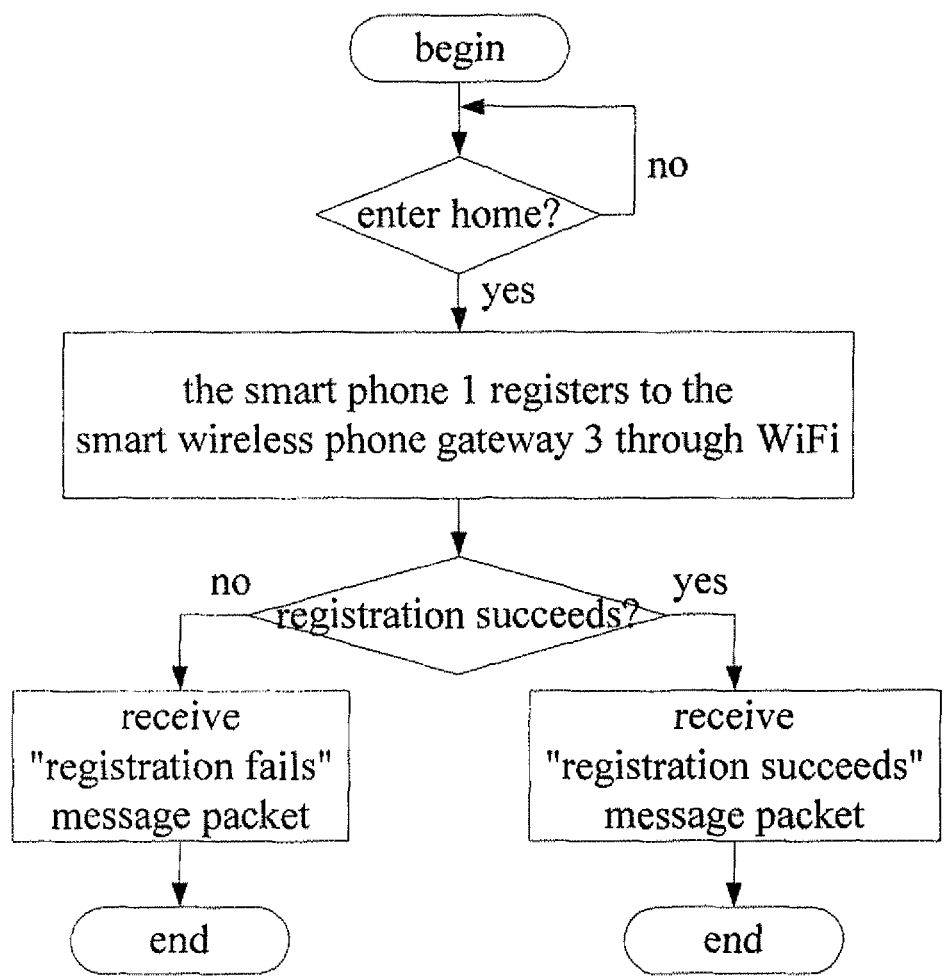
FIG. 17 shows the registration flow chart.

The system flow charts of the software methods according to the present invention are shown in FIG. 17, 18, 19, 20.

Referring to FIG. 17 of the registration flow chart first, a user brings a smart phone 1 outdoors. The smart phone 1 repeats to detect WiFi message, but cannot detect any WiFi message. As the user enters home, the smart phone 1 detects the WiFi message from the smart wireless phone gateway 3 at home, so the smart phone 1 registers to the smart wireless phone gateway 3. If the registration succeeds, a "registration succeeds" message packet will be received; if the registration fails, a "registration fails" message packet will be received, the user will check if the user's information is wrong.

Figure 18:
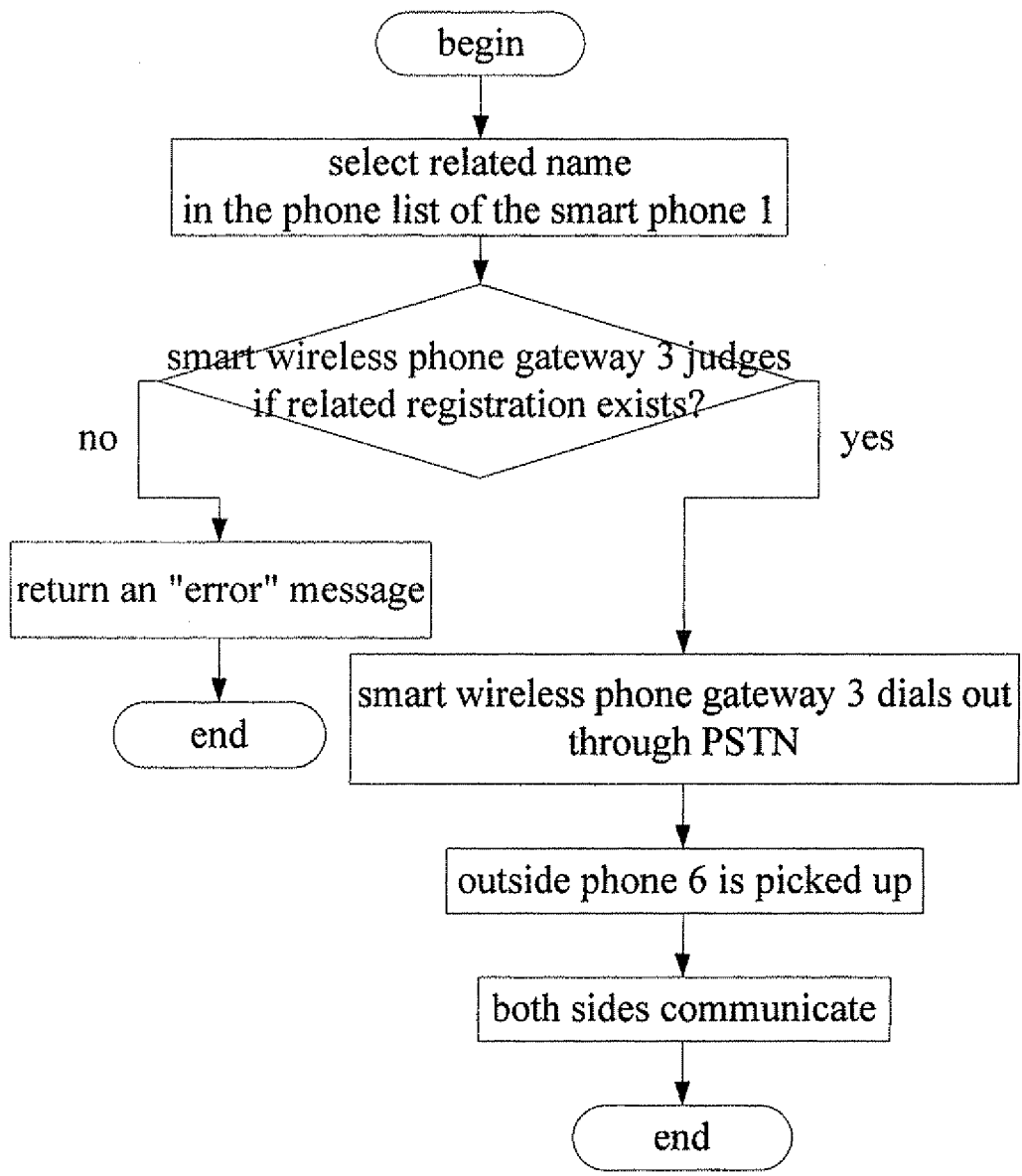
FIG. 18 shows the dialing-out flow chart.

Referring to FIG. 18 of the dialing-out flow chart next, the user will use the smart phone 1 for dialing-out, the user selects related name in the phone list of the smart phone 1, and touching the name displayed on the smart phone 1 for dialing out. The smart wireless phone gateway 3 will then judge if related registration exists or not, if yes, then the smart wireless phone gateway 3 will dial through ChungHwa Telecom 5 (PSTN), after the outside phone 6 is picked up, both sides communicate; if no, then the smart wireless phone gateway 3 will return an "error" message to the smart phone 1.

Figure 19:
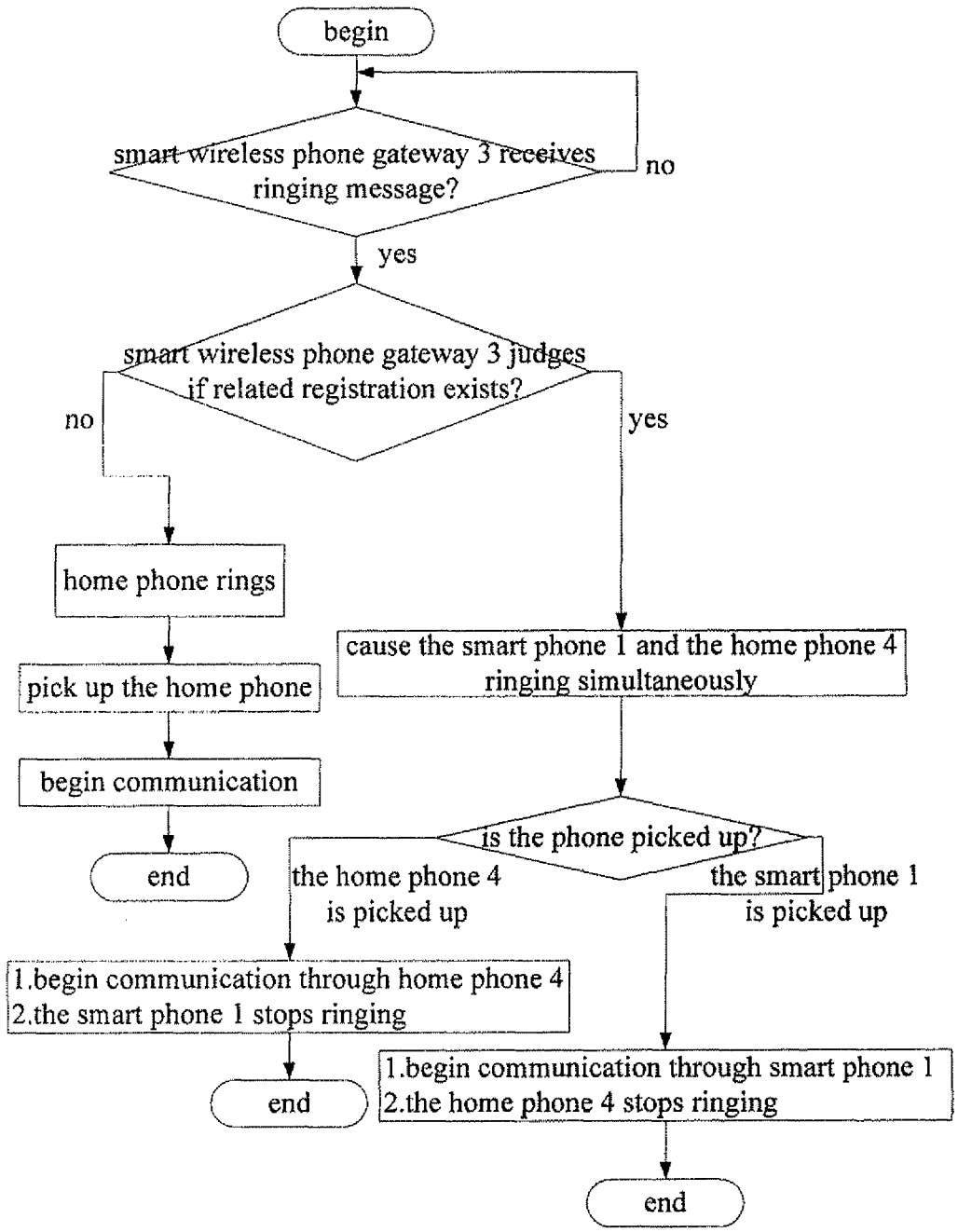
FIG. 19 shows the dialing-in flow chart.

Referring to FIG. 19 of the first dialing-in flow chart, the outside phone 6 calls the home phone 4 through ChungHwa Telecom 5 (PSTN), The smart wireless phone gateway 3 waits for the ringing message from the ChungHwa Telecom 5. If no ringing message, then wait continually; if a ringing message is received, then the smart wireless phone gateway 3 judges if there is user related registration information. If no user related registration information, then the smart wireless phone gateway 3 causes the home phone 4 ringing, so the user can only pick up the home phone 4 for communication. If the user related registration information exists, then the smart wireless phone gateway 3 causes the smart phone 1 and the home phone 4 ringing simultaneously. If the user picks up the home phone 4, then the smart phone 1 stops ringing. If the user picks up the smart phone 1, then the home phone 4 stops ringing.

Figure 20:
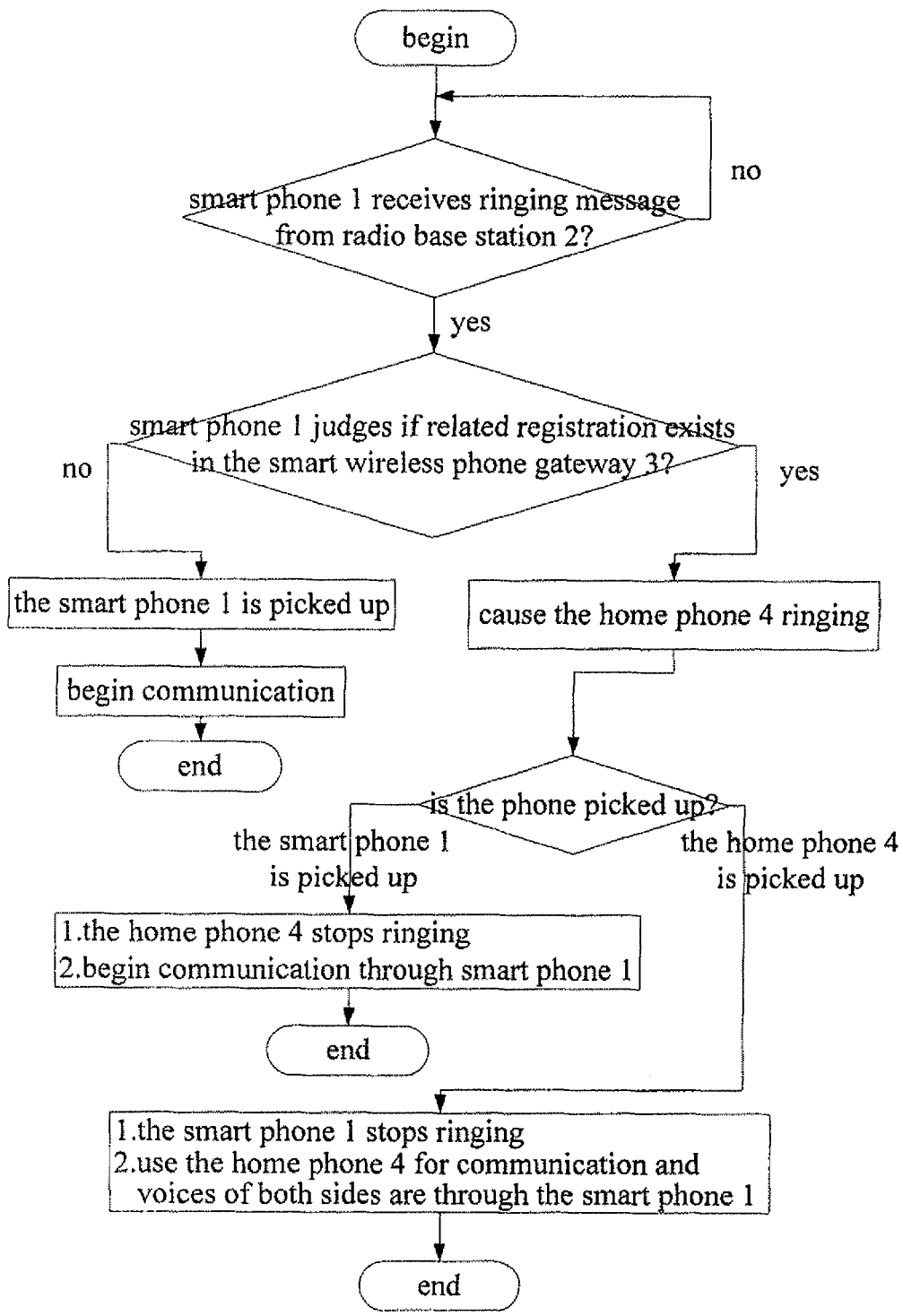
FIG. 20 shows another dialing-in flow chart.

Referring to FIG. 20 of the second dialing-in flow chart, the outside phone 6 calls the smart phone 1 through the radio base station 2. The smart phone 1 waits for the ringing message from the radio base station 2. If no ringing message, then wait continually; if a ringing message is received, then the smart phone 1 judges if the smart phone 1 had registered in the smart wireless phone gateway 3, if no, then the home phone 4 does not ring, the user can only pick up the smart phone 1 for communication; if yes, then the home phone 4 also rings. Thereafter, if the user picks up the home phone 4, then the smart phone stops ringing, and the smart phone will receive the call from the outside phone 6 through the radio base station 2, and let the user use the home phone 4 for communication, voices of both sides are through the smart phone 1. If the user picks up the smart phone 1, then the home phone stops ringing.

The advantages of the present invention are stated as below:
1. Use the home phone 4 for communication at home can avoid the harm of 2G/3G electromagnetic wave, since signals of wireless local area communication are far weaker than signals of 2G/3G electromagnetic wave.
2. Use the home phone 4 for communication at home can save the communication cost.
3. Use the phone list of the smart phone 1 for dialing at home is very convenient.
4. The system of the present invention supports the usage of multi-user, each member of a family can register in the smart wireless phone gateway 3 for communication.
5. The system of the present invention is not limited to SIP, other protocols such as Skype, H.323, MGCP can also adapted to the system of the present invention.
6. Wireless local area communication system of the present invention includes WiFi, Bluetooth, ZigBee . . . etc.
7. The category of the smart phone 1 can expand to Tablet PC and the PDA that include a smart communication function.
8. The PSTN in the present invention can be replaced by Internet.

The scope of the present invention depends upon the following claims, and is not limited by the above embodiments.

What is claimed is:

1. A smart phone system for dialing through local call, comprising:
a smart phone with wireless local area communication function;
a home phone;
a public switched telephone network (PSTN);
a radio base station;
an outside phone;
a smart wireless phone gateway placed between the home phone and the PSTN for accepting a registration and a dialing of the smart phone and dialing out through the PSTN; and for accepting a dialing-in from the outside phone through the PSTN to the home phone so as to cause the smart phone and home phone ringing simultaneously, when a user picks up the home phone, the smart phone stops ringing, when the user picks up the smart phone, the home phone stops ringing; and for accepting a dialing-in from the outside phone through the radio base station to the smart phone so as to cause the smart phone and home phone ringing simultaneously, when the user picks up the home phone, the smart phone stops ringing, when the user picks up the smart phone, the home phone stops ringing;
wherein the smart wireless phone gateway comprises an antenna, a power terminal, an FXS interface, an FXO interface, a digital signal processor, a VoIP processor, an access point, a power circuit, a flash memory, an RJ11 PSTN terminal, an RJ11 telephone line terminal and a relay; and
wherein a software in the VoIP processor is based on Linux system for executing four actions as below:
a. processing the registration of the smart phone to the VoIP processor;
b. analyzing an INVITE message received from the antenna by the VoIP processor to take out a telephone number, and then dial out the telephone number through the FXO interface;
c. when a ringing signal is detected by the FXO interface (i.e. an outside phone is dialing in through the PSTN), the ringing signal will cause the home phone ringing through FXS interface, and cause the smart phone ringing through the VoIP processor, the access point and the antenna;
d. when the outside phone dials to the smart phone through the radio base station, the smart phone issues a "Ring-in" message by wireless local area communication through the antenna, the access point to the VoIP processor, the VoIP processor will then cause the home phone ringing through the FXS interface.

2. The smart phone system for dialing through local call according to claim 1, wherein the wireless local area communication is WiFi, Bluetooth or ZigBee.

3. The smart phone system for dialing through local call according to claim 1, wherein the smart phone can be replaced by a Tablet PC or a PDA that include a smart communication function.

4. The smart phone system for dialing through local call according to claim 1, wherein the PSTN can be replaced by an Internet.

5. A method for smart phone system to dial through local call, based on a smart phone system for dialing through local call, the smart phone system comprising:
   a smart phone with wireless local area communication function;
   a home phone;
   a public switched telephone network (PSTN);
   a radio base station;
   an outside phone;
   a smart wireless phone gateway placed between the home phone and the PSTN for accepting a registration and a dialing of the smart phone and dialing out through the PSTN; and for accepting a dialing-in from the outside phone through the PSTN to the home phone so as to cause the smart phone and home phone ringing simultaneously, when a user picks up the home phone, the smart phone stops ringing, when the user picks up the smart phone, the home phone stops ringing; and for accepting a dialing-in from the outside phone through the radio base station to the smart phone so as to cause the smart phone and home phone ringing simultaneously, when the user picks up the home phone, the smart phone stops ringing, when the user picks up the smart phone, the home phone stops ringing;
the method comprising:
a. a registration step: a user brings a smart phone outdoors, the smart phone repeats to detect an WiFi message; as the user enters home, the smart phone detects the WiFi message from the smart wireless phone gateway at home, so the smart phone registers to the smart wireless phone gateway; if the registration succeeds, a "registration succeeds" message packet will be received; if the registration fails, a "registration fails" message packet will be received, the user then check if a user's information is wrong;
b. a dialing-out step: the user uses the smart phone for dialing-out, the user selects related name in a phone list of the smart phone, and then touches a name displayed on the smart phone for dialing out; the smart wireless phone gateway will then judge if related registration exists or not, if yes, then the smart wireless phone gateway will dial through the PSTN, after the outside phone is picked up, both sides communicates; if no, then the smart wireless phone gateway will return an "error" message to the smart phone;
c. a first dialing-in step: the outside phone dials the home phone through the PSTN, the smart wireless phone gateway waits for a ringing message from the PSTN; If no ringing message, then wait continually; if a ringing message is received, then the smart wireless phone gateway judges if there is a user related registration information; if no user related registration information, then the smart wireless phone gateway causes the home phone ringing, so a user can only pick up the home phone for communication; if the user related registration information exists, then the smart wireless phone gateway causes the smart phone and the home phone ringing simultaneously; if a user picks up the home phone, then the smart phone stops ringing, if the user picks up the smart phone, then the home phone stops ringing;
d. a second dialing-in step: the outside phone dials the smart phone through the radio base station, the smart phone waits for a ringing message from the radio base station; if no ringing message, then wait continually; if a ringing message is received, then the smart phone judges if the smart phone had registered in the smart wireless phone gateway; if no, then the home phone does not ring, a user can only pick up the smart phone for communication; if yes, then the home phone also rings; thereafter, if the user picks up the home phone, then the smart phone stops ringing, and the smart phone will receive the call from the outside phone through the radio base station, and let the user use the home phone for communication, voices of both sides are through the smart phone; if the user picks up the smart phone, then the home phone stops ringing.

* * * * *